Nov. 16, 1954 L. BERMEJO 2,694,231
AUTOMOBILE CANOPY
Filed Aug. 7, 1953 2 Sheets-Sheet 1
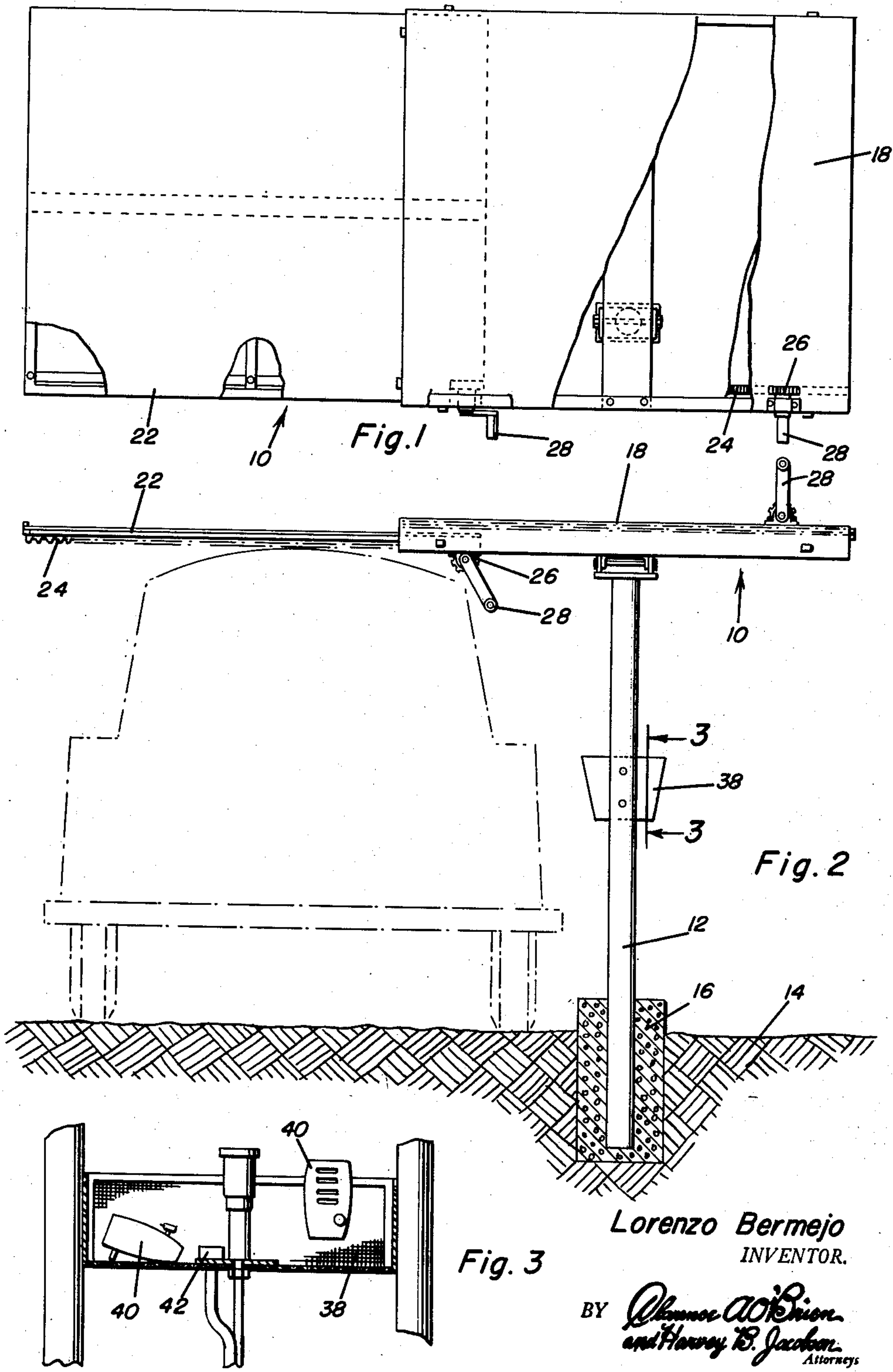
Lorenzo Bermejo
INVENTOR.
BY Clarence A. O'Brien and Harvey B. Jacobson
Attorneys Nov. 16, 1954
L. BERMEJO
2,694,231
AUTOMOBILE CANOPY
Filed Aug. 7, 1953
2 Sheets-Sheet 2
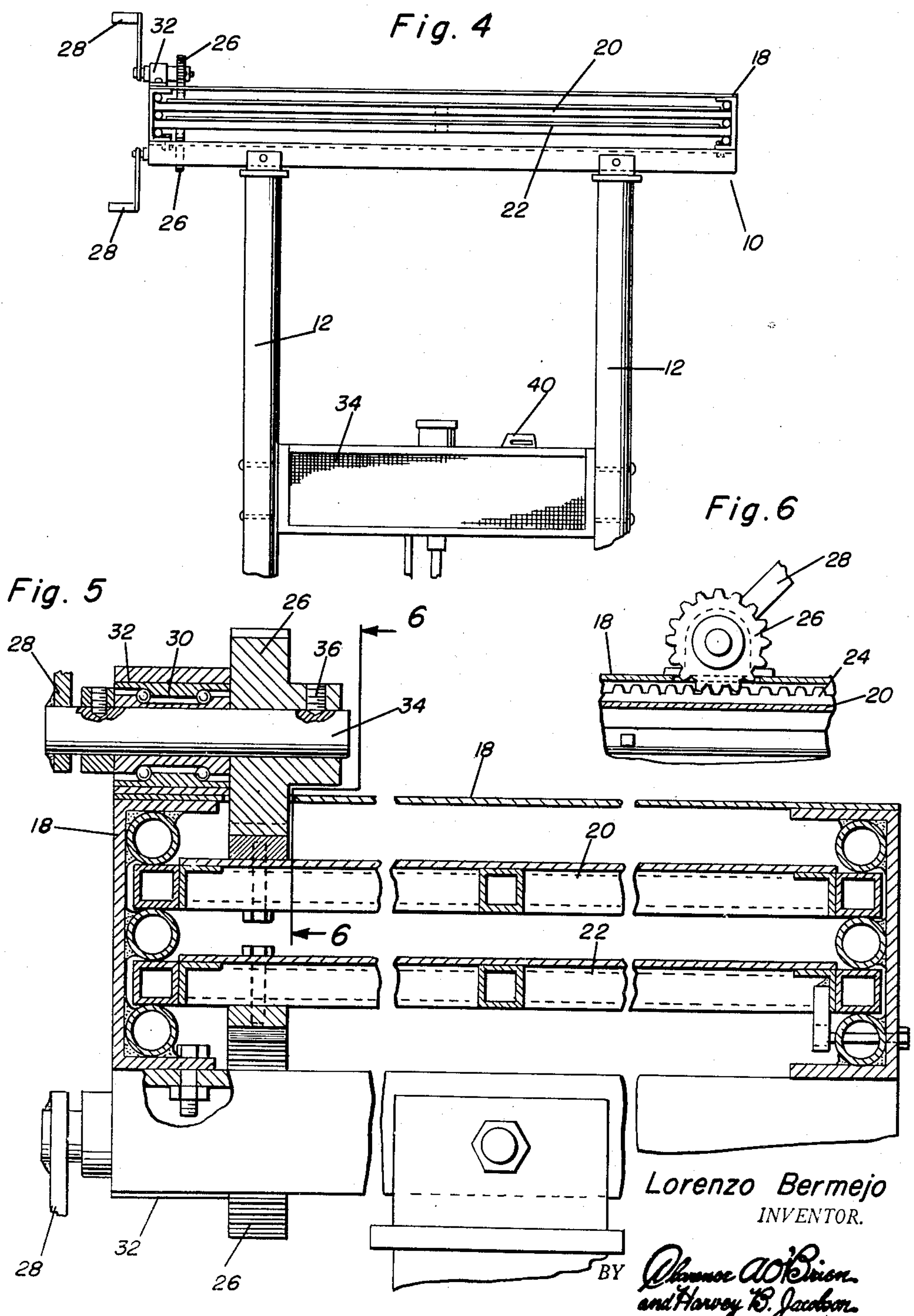
Lorenzo Bermejo
INVENTOR.
BY Clarence A. O'Brien and Harvey B. Jacobson
Attorneys 2,694,231

AUTOMOBILE CANOPY

Lorenzo Bermejo, Meadowbrook, W. Va.

Application August 7, 1953, Serial No. 372,889

1 Claim. (Cl. 20—1.12)

This invention relates to automobile canopies and more specifically provides an automobile canopy which is used in drive-in theaters to protect the automobiles from rain which adversely affects the vision of the automobile occupants while viewing the screen of such a theater.

An object of this invention is to provide an automobile canopy which eliminates the poor visibility often encountered by drive-in theater patrons which is caused by rain or other weather hazards.

Another object of this invention is to provide an automobile canopy which is retractable and may be extended over individual automobile windshields by the occupants as desired.

A further object of this invention is to provide an automobile canopy having a stationary portion which protects the speakers and an electric outlet from the weather and a movable canopy which is extended over the windshield of an automobile in the event of rain.

A still further object of this invention is to provide an automobile canopy which is sturdy, easy to operate, and cheap to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of an automobile canopy of this invention having portions broken away and showing details of the stationary canopy with one of the movable canopies in extended position and one of the movable canopies in retracted position;

Figure 2 is a side elevation of the structure shown in Figure 1 showing the general arrangement of the supporting posts and the relationship of the canopy to the automobile and the relationship of the canopy actuating means;

Figure 3 is a transverse vertical section taken substantially along section line 3—3 of Figure 2 showing details of the speaker supporting basket and the electric outlet for an automobile heater;

Figure 4 is a fragmental side elevation taken from the right hand side of Figure 2 showing the relationship of the stationary canopy and the supporting posts with its specific arrangement of the movable canopy operating means;

Figure 5 is a transverse section taken substantially along the axis of the upper movable canopy actuating means showing details of the arrangement of the movable canopies in this stationary canopy and the actuating means therefor; and Figure 6 is a detail vertical section taken substantially along section line 6—6 of Figure 5 showing details of the rack and pinion actuating means for the movable canopy.

Referring now more specifically to the accompanying drawings in detail, it will be seen that the numeral 10 generally designates an automobile canopy of this invention wherein the canopy 10 comprises a pair of supporting posts 12 which are embedded in the ground surface 14 with suitable anchoring means such as concrete 16 and wherein a stationary canopy 18 is secured to the upper end of the supporting post 12.

As clearly seen in Figure 1, the stationary canopy 18 is substantially rectangular and as seen in Figure 5, the stationary canopy 18 forms a hollow receptacle for a pair of movable canopies 20 and 22 which are generally rectangular in form and having a frame member with a roof forming portion across the top thereof. As best seen in Figures 5 and 6, the upper canopy 20 has a rack member 24 secured to the upper surface along one edge thereof and the stationary canopy 18 has a pinion 26 journalled thereon in engagement with the rack 24 and having a handle 26 secured thereto for turning the pinion 26 and moving the rack 24 and the canopy 20 outwardly and inwardly from the stationary canopy 18. As clearly shown in Figures 1, 2, and 4, the lower canopy 22 is operated in a similar manner with a rack 24, a pinion 26, and an operating handle 28. As clearly seen in Figure 5, the pinion 26 is journalled in a bearing 30 which is secured in a housing 32 on the stationary canopy 18 by the use of a shaft 34 which is secured to the gear by a set screw 36 in a conventional manner, and the handle 28 is welded to the end of shaft 34 for turning the pinion gear 26.

As best seen in Figures 2 and 3, a basket 38 is secured between the supporting posts 12 adjacent its mid point for supporting a plurality of speakers 40 and an electric outlet 42 for a heater to be used in the automobile during cold weather. As clearly seen, the stationary canopy 18 forms a roof over this basket 38 thereby keeping the speakers 40 and the electric outlet 42 dry at all times.

The operation of the device will be readily understood. When an automobile is parked in a drive-in theater having a screen and an adjacent area with a plurality of spaces arranged to permit the occupants of an automobile to see such a screen for a movie to be projected thereupon and in the event of a storm or rain the occupants of the automobile may turn handle 28 thereby rotating pinion gear 26 which is in mesh with the rack 24 which moves outwardly along with the canopies 20 and 22 and such a canopy protects the windshield of an automobile from the falling rain or other weather and the visibility of the occupants of the automobile is unimpaired. The speakers 40 and the speaker junction box as well as an electric junction box 42 are protected at all times from the rain or weather hazards by the stationary canopy 18 and this prevents damage to the speakers and junction boxes which would be caused by moisture and the basket 38 provides an ample support for such speakers and junction boxes. As clearly seen, the occupants of the automobile may reach the canopy actuating means from the interior of the automobile without exposing themselves to the rain or other weather hazards while adjusting the movable canopies.

Anyone wishing to view a movie may drive to the drive-in theater and by extending one of the canopies 20 or 22 he may view the screen with good visibility regardless of the weather without the necessity of getting himself wet such as is necessary when one parks on the street and walks to a theater. The tone qualities of the speaker system remain good due to the protection afforded the speakers by the stationary canopy and the possibility of any short circuit caused by moisture to the electric outlet and the speaker outlet is eliminated.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In a drive-in theater having a screen and an area adjacent thereto comprising a plurality of side-by-side spaces in which automobiles may be parked, canopies projecting over the windshield area of said automobiles, said canopies comprising a pair of spaced supporting posts, a basket extending between said posts for supporting speakers, a stationary canopy secured to the upper end of said posts and projecting outwardly from opposite sides of said posts, said stationary canopy overlying said speakers, and movable canopies adjustably secured to opposite edges of said stationary canopies and telescoping inwardly with respect to said stationary canopy with one of said movable canopies being positioned above the other thereof, racks carried by each of said movable canopies, pinions engaging said racks and means for actuating said pinions to adjust said movable canopies secured to said fixed canopy adjacent the periphery thereof.

References Cited in the file of this patent

UNITED STATES PATENTS

| Number | Name | Date |
|---|---|---|
| 105,829 | Monce | July 26, 1870 |
| 1,006,374 | Erb | Oct. 17, 1911 |
| 1,289,802 | Jones | Dec. 31, 1918 |
| 2,045,180 | Douthwaite | June 23, 1936 |
| 2,136,130 | Gorlenko | Nov. 8, 1938 |